United States Patent Office 2,832,072
Patented Apr. 22, 1958

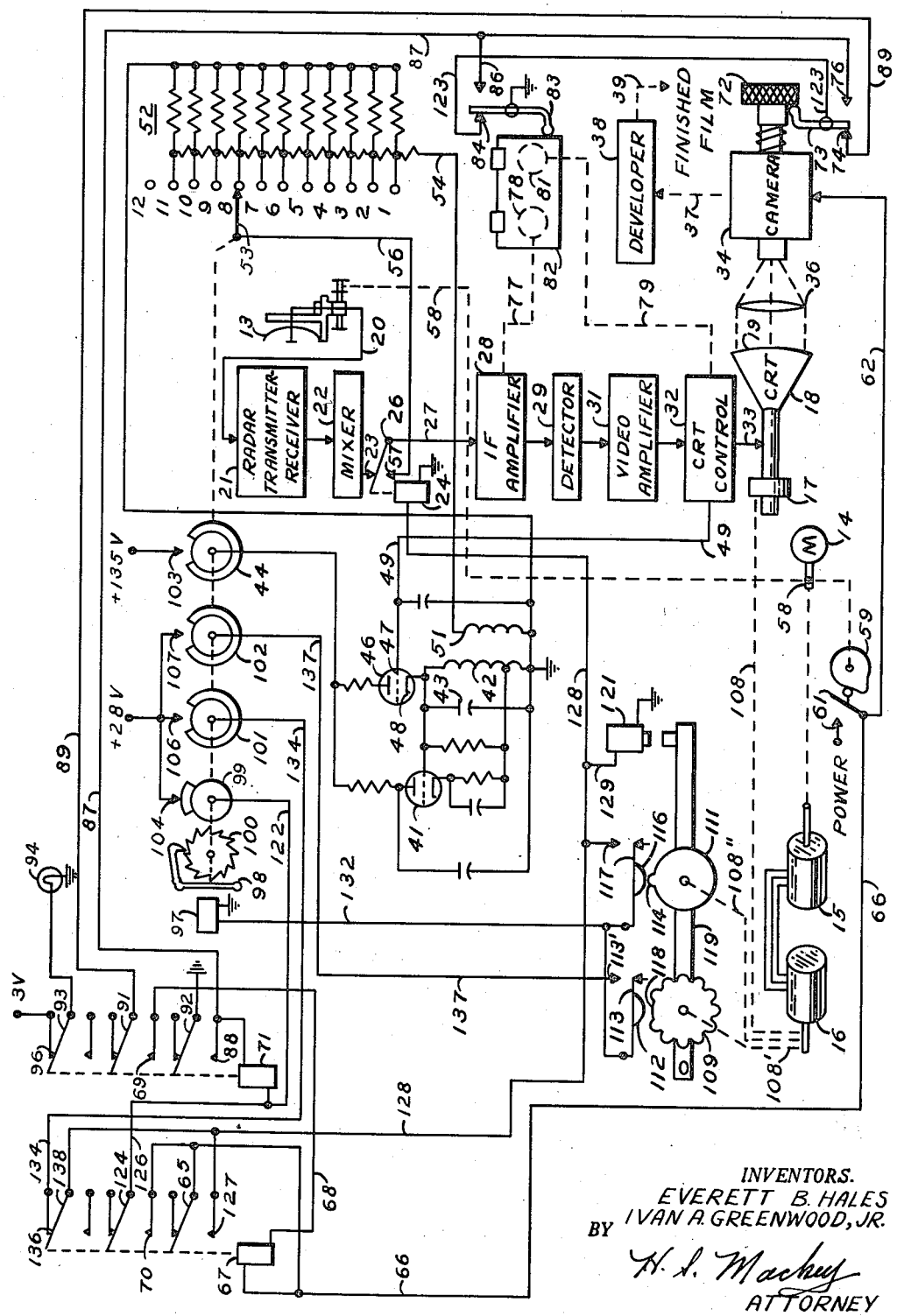

2,832,072

GRAY SCALE CALIBRATOR

Everett B. Hales, Hawthorne, N. Y., and Ivan A. Greenwood, Jr., Stamford, Conn., assignors to General Precision Laboratory Incorporated, a corporation of New York Application March 12, 1956, Serial No. 570,781

11 Claims. (Cl. 343—5)

This invention relates to electro-optical calibration devices and particularly to apparatus for standardizing the film density of the photographic record of a radar display in terms of the radar received signal intensity.

In the use of radar instruments it is sometimes desired to relate the display intensity to the echo power received, for knowledge of received power affords some information regarding the target. While many variables such as range, looking angle and transmitter power affect the received power and therefore the display intensity, under certain conditions of design and use all of these variables may be accounted for, so that specific correlation between the received power and the display intensity becomes useful.

This invention provides means for such specific correlation in the particular case in which an area display, such as a plan position indicator (P. P. I.), is employed, and in which the display is photographically recorded rather than visually perceived.

In such a photographically recorded radar system there are a great many variables affecting the density of the film record. These include, to mention only a few, the amplifier gain, the cathode ray tube intensity setting, the camera settings, and the degree of film development. Because of these variables and many others it becomes impractical to calibrate all components in order to evolve a relationship between film density and received signal strength which has any continuing constancy or even any initial validity. The method employed in this invention therefore, is to insert a standard signal into the radar instrument, and to compare the photographic result with that obtained from the radar signal of interest. By means of a quantitative comparison of this sort a good valuation of the intensity of the radar signal may be secured. Even where an absolute valuation is impossible because of changes in transmitter signal level, or for other reasons, this device is of value in giving quantitative relative signal strength comparisons.

This invention may be used with any area display such as sector scan displays and television displays when rapid switches are employed. However, the apparatus of the invention as described in the example is designed for use with a photographically recording radar having a P. P. I. display, which may be designed so that it can be both visually observed and photographed. Each photograph may be a still picture made on one frame of motion picture film strip, recording the luminance of each point of the picture on the cathode ray screen during one continuous 360° azimuth rotation of the antenna. The film strip is developed in the usual manner to form a permanent photographic record.

In the application of this invention to such a recording radar a switch is provided at the output of the radio frequency mixer, so that, instead of the radar signal being applied to the intermediate frequency amplifier, a signal at the intermediate frequency may be introduced. During one complete rotation of the antenna the intensity of this signal is changed in steps, producing sectors on the face of the cathode ray tube having correspondingly differing luminosities. This sector pattern is photographed, the camera shutter remaining open for the complete antenna rotation. This results in a picture on one frame of the film consisting of a number of sectors of a disc, all or most of these sectors exhibiting varying shades of film density or grayness.

The relation between amplifier input signal intensity and full density can now be charted, and since the relation between a selected P. P. I. picture position and the gray chart can be quantitatively compared by a densitometer, the correlation between signal and film at the time of test can be ascertained. If the gray scale picture and the P. P. I. picture are taken one immediately after the other, or with only a short time interval intervening so that conditions are not likely to have changed, the standardization is valid. This operation makes the reasonable assumption that the gain between antenna and amplifier input remains constant during the two pictures.

The purpose of this invention is, in conjunction with a recording plan position radar, to provide a graduated gray scale for correlating density of the radar film record with received radar signal intensity.

Further understanding of this invention may be secured from the detailed description and the associated single figure of the drawing schematically indicating apparatus for carrying out the purposes of the invention.

Referring now to the drawing, a conventional airborne radar instrument employs a scanning antenna 13 which is continuously and steadily rotated in azimuth by its motor 14. The motor 14 through a synchro system including transmitter 15 and synchro motor 16 also operates the rotating yoke 17 of a cathode ray tube 18, which indicates on its face 19 the plan position output of the radar system. The radar echo signals picked up by the antenna 13 are conducted through conductor 20 to the transmitter receiver 21 and mixer 22, where they are transformed to a lower frequency for amplification. The mixer output signals, which may have a frequency, for example, of 60 mc. p. s., are transmitted to the normally closed back contact 23 of a relay having a coil 24. While the relay is deenergized the armature 26 rests on its back contact 23, and the signals are conducted through conductor 27 to an intermediate frequency (I. F.) amplifier 28.

It is of course conventional to omit the I. F. amplifier if desired and connect the switch 26 directly to the video amplifier, in which cases all statements regarding the I. F. amplifier apply to the video amplifier, and the standardizing generator emits a video frequency.

The I. F. amplifier output, after demodulation in detector 29 and further amplification in video amplifier 31, is applied to the cathode ray tube control unit 32. This group of conventional circuits includes the cathode ray tube sweep generator, the intensity control circuit and the sweep return blanking circuit. The P. P. I. signal is applied to the cathode ray tube 18 from control unit 32 through conductor 33 to form the plan position indication. The face 19 of cathode ray tube 18 is photographed by a camera 34 through an optical system schematically represented by lens 36. This camera uses strip film such as 35 mm. motion picture film, but takes still pictures, one per frame, each picture being exposed during one 360° rotation in azimuth of the antenna 13. During this exposure time, of course, the cathode ray tube sweep is also rotated 360° by the synchronous rotation of yoke 17. The exposed but undeveloped camera film as it leaves the camera is schematically represented by the dashed line 37. The film is developed by any desired process, either adjacent to the airborne camera 34 and immediately after exposure, or later on the ground. In either case the development processor is represented by developer 38. The only requirement made by the instant invention relative to this developer is that the relation between film exposure and film density is maintained reasonably constant from frame to frame of the film strip. The developed negative film strip produced by the developer is indicated by the dashed line 39. Positive film may be printed from the negative film and employed for the purposes of this invention, in which case the rectangle 38 represents both the developer and printer and the dashed line 39 represents positive finished film. Although positive film may be easier to interpret visually, negative film is more accurate, being the product of a shorter process than positive film. Therefore, for the purpose of this description negative film is chosen as the final product of this invention.

To calibrate the density of finished film 39 in terms of the radar input sigal strength and permit the calibration of any particular area or point of the film, a calibrating signal of a selected standard and invariable magnitude is generated by an oscillator of suitable stability. The frequency of this unmodulated alternating current is that of the center of the I. F. pass band, which is selected in this example, as 60.0 mc. p. s. The oscillator comprises triode 41 together with tank inductor 42 and capacitor 43. The oscillator is switched on and off by a cam 44 controlling its anode potential, and is additionally switched on and off electronically by an impedance tube 46. This tube has no anode current flow when its control grid 47 is negative, and the tube then has no effect on oscillator operation. When, however, grid 47 is made positive, anode current flows and tube impedance drops to a few hundred ohms, effectively grounding the upper end of inductor 42 to which cathode 48 is connected and thus stopping the oscillation of the tank circuit. The grid 47 is made positive during cathode ray tube sweep returns, thus blanking the oscillator at these times. To accomplish this, grid 47 is connected by means of conductor 49 to the sweep blanking circuit in the control unit 32.

The oscillator output is taken from a pickup coil 51 inductively coupled to inductor 42 and is attenuated in a precision attenuator. This attenuator may be of any conventional form, one form being that of the depicted attenuator 52. This attenuator 52 consists of a conventional resistance network having eleven adjusting taps marked 1 to 11, and a 12th open contact. The input and output impedances are matched to their connections and are not changed by tap changes. The attenuator is made in circular form, although developed schematically in Fig. 1 for clarity, and has no stops so that its slider 53 can rotate continuously from step 1 through all steps to step 12 and on to step 1 again. The input signal is secured through conductor 54 from coil 51, and encounters a 6 db attenuation when slider 53 is on tap 1, 10 db additional attenuation on tap 2 and 10 db added attenuation for every added tap to tap 11, where the attenuation is 106 db. This amount of attenuation slightly more than covers the gray scale range to be standardized. Output is taken from the attenuator slider 53 through conductor 56, which is connected to the normally open contact 57 of relay 24.

When relay 24 is operated, the input conductor 27 of the intermediate frequency amplifier 28 is switched from the radar mixer 22 to the attenuator output conductor 56. Thus the standardized signal is not applied to the radar antenna or receiver, but to the input of the intermediate frequency amplifier. However, on the assumption that the components from the antenna to the intermediate frequency amplifier are perfectly stable, as good standardization is secured in this manner as would be secured by applying a standard radar signal to the antenna.

Operation of relay 24 is effected by the rotating antenna 13 and its motor 14. Antenna 13 is connected through shaft 58 not only to its motor 14 but also to a cam 59 closing its follower contact 61 once for each revolution of the antenna. Closing of contact 61 applies electrical power through conductor 62 to camera 34 to advance its film by one frame, closing its shutter during film advance. Closing of contacts 61 also applies a pulse of power to conductor 66.

The power pulse consists of +28-volt potential from a low impedance source, and is applied through conductor 66 to a relay coil 67 and also to its contact armature 65 and normally open contact 70. The return conductor 68 of coil 67 is connected to a front contact 69 of another relay having coil 71, so that when the latter relay is normal, relay 67 cannot operate. It is desired that standardization pictures be taken only after the circuit has been changed in such a way as to affect the relation between radar received signal strength and photographic film density. Therefore relays are employed to control the relay switch 24 so that a single standardizing picture is taken after a circuit change, after which the photographing of the P. P. I. screen is resumed in successive frames.

Only three parameters affecting film density are under control of the operator. They are:

(1) Camera aperture,
(2) Amplifier gain, and
(3) Cathode ray tube spot intensity.

Each of these controls has therefore been interlocked with the circuit so that a standardization picture is automatically taken after any change in any of these three adjustments.

The camera aperture is adjusted by pushing in a clutching knob 72 until it engages, then turning. In the operation of engaging the knob a lever 73, normally contacting a contact 74, moves to contact 76, moving back to contact 74 when the knob is declutched.

The intermediate frequency amplifier 28 gain is adjusted through shaft 77 by a knob 78, and the cathode ray tube spot intensity or brightness is adjusted, through circuits in the control 32, by shaft 79 and knob 81. Both knob 78 and knob 81 are enclosed in a box having a spring hinged lid 82, so that it is necessary to open lid 82 before either control can be changed, the lid returning to its closed position after the adjustment. A lever 83 is so arranged that when the lid 82 is opened, the lever 83 moves from contact 84 to contact 86, and moves back to contact 84 when the lid closes.

Contact 84 is connected through conductor 123 to lever 73, and normally open contacts 76 and 86 are connected together and through conductor 87 to relay coil 71 and to its normally open contact 88. Normally closed contact 74 is connected through conductor 89 to contact armature 91 of relay 71 and lever arm 83 is grounded.

Contact armature 92 of relay 71 is grounded and contact armature 93 is connected to operate a lamp 94. This lamp is positioned physically near the camera 34 so that it appears in the photographs, and when lighted indicates that standardization has been made. When not lighted it indicates that one of the three above-mentioned adjustments is being made. The normally closed contact 96 is connected to a source of potential to operate lamp 94.

A stepping rotary relay includes coil 97, stepping armature 98, ratchet 100 and cams 99, 101, 102 and 44. This relay is also connected to attenuator 52. The relay is arranged to rotate the four cams 99, 101, 102 and 44 and the attenuator 52 through progressive angular steps of 30°, each step occurring when a potential pulse is applied to its coil 97. Operation occurs at the leading edge of the pulse. A regulated potential of +135 volts is applied to the brush 103 of cam 44, and a potential of +28 volts is applied to the three brushes 104, 106 and 107 of cams 99, 101 and 102 respectively.

The rotating yoke 17 of cathode ray tube 18 is turned through shaft 108 and the synchro system comprising receiver 16 as before stated. Extensions of this shaft 108' and 108" also turn two cams 109 and 111. Cam 109 is provided with 11 projections 30° apart and a follower 112 with normally open contacts 113 and 113'. Cam 111 is provided with a single projection 114 and a follower 116 with normally open contacts 117. The cams are so phased that when the single projection 114 is under its follower 116, the space 118 of cam 109 is under its follower 112. The cams 109 and 111 are both journalled in a lever 119 which is normally so positioned that the cam projections do not engage their followers at any cam angle. The lever is moved into camming position by a solenoid 121.

In the normal operation of the plan position recording system, when no adjustments are made, the camera 34 photographs the display 19 and advances one frame every antenna revolution. However, if any one of the above three adjustments be made a standardizing picture is automatically taken after the adjustment has been completed. For example, let it be supposed that the intermediate amplifier gain is to be changed. To accomplish this the cover 82 is raised and the knob 78 is turned. The act of raising cover 82 moves switch armature 83 to contact 86, grounding relay coil 71 through conductor 87. The other side of coil 71 being connected to the 28-volt supply through conductor 122, cam 99 and brush 104, relay 71 operates and locks closed through its contacts 88 and 92. Operation of relay 71 extinguishes lamp 94, indicating that an adjustment is being made. When the gain adjustment has been completed the cover 82 is closed, moving contact armature 83 back to contact 84. This applies ground through conductor 123, switch contacts 73 and 74, conductor 89, relay contacts 91 and 69, and conductor 68 to relay coil 67.

If instead of adjusting the IF amplifier gain control 78, either the cathode ray intensity control knob 81 or the camera aperture adjusting knob 72 be adjusted, the circuit including the switch levers 83 and 73 is such that the same effect is accomplished as just described.

When the antenna 13 next arrives at 180° azimuth it operates cam 59, closing contacts 61. It also in its rotation of synchro transmitter 15 with motor 16 brings the cathode ray tube yoke 17 to 180° azimuth and brings the cams 109 and 111 to the positions illustrated and previously described, with blank space 118 and cam projection 114 at their followers.

As before stated, when contacts 61 close a pulse is applied to conductor 66. This power pulse operates relay coil 67. Relay 67 locks closed through contacts 70 and 124, conductors 126 and 122, cam 99 and brush 104. Relay 67 applies power through contacts 65 and 127 and conductors 128 and 129 to operating coil 121, moving lever 119 into position for operation of the follower contacts by cam wheels 109 and 111. Relay 67 also applies power through conductor 128 to relay 24, connecting the input of the intermediate frequency amplifier to the 60 mc.p.s. generator 41 and attentuator 52. When cam follower contacts 117 close upon operation of coil 121 they apply power through conductor 132 to step switch magnet 97, advancing it 30°. This moves the attenuator brush 53 from contact 12 to contact 1 and advances cams 99, 101, 102 and 44 by 30°.

Movement of cam 99 breaks its power supply to relay 71, so that it will release upon termination of the power pulse. Movement of cam 101 by 30° applies 28-volt power to conductor 134 and the back contact 136 of relay 67. Movement of cam 102 by 30° applies 28-volt power to conductor 137 and the back contact 113' of cam follower 112. Operation of cam 44 by 30° applies 135-volt anode power to the 60 mc.p.s. oscillator triode 41, causing it to oscillate.

Rotation of cam 111 by synchro motor 16 after less than 30° of antenna rotation releases contacts 117, releasing the step switch solenoid 97.

At the end of the power pulse applied to relays 67 and 71 these relays are released, again lighting signal lamp 94. The release of relay 67 does not release solenoid 121 or relay 24 as the path for power to them is transferred to conductor 128, contact armature 138, back contact 136, conductor 134, cam 101 and brush 106.

Rotation of cam 109 by synchro motor 16 at 30° of antenna rotation from its initial 180° position closes contacts 113 and 113', again operating step switch solenoid 97 and stepping the attenuator 52 to its second step. Cams 99, 101, 102 and 103 are also advanced 30°. This occurs again every 30° of antenna rotation.

The brush 53 of attenuator 52 breaks contact between its contact points, so that during these intervals of about 6° the amplifier input is zero except for leakage, noise, etc. As the attentuator revolves it applies 11 steps of attenuated 60 mc.p.s. power to the amplifier, resulting in 11, 24° sectors of regularly varying degrees of luminosity on the cathode ray tube screen 19. These in turn result in 11, 24° sectors of regularly varying degrees of grayness on the developed film 39. Since the output power of the generator 41 is accurately known, and since the attenuation of that power at each step of the attenuator is known, the power input to the intermediate frequency amplifier corresponding to each sector of the gray scale film can very easily be computed by multiplying the generator power by the attenuation factor of the attenuator tap corresponding to the sector.

It is to be understood that although in the described design the sector widths of 6° and 24° are used, the invention is not restricted to these widths.

In order to ascertain what received power at the intermediate frequency amplifier is represented by the density of a particular area or point on a photograph of the radar screen, that photograph is compared with the last preceding gray scale film on the film strip. For quantitative results the comparison of the radar photograph area with the gray scale sectors may be made by a comparator. The two gray scale sectors which bracket in grayness the area under examination is thus ascertained, and if necessary interpolation may be accurately made by use of the comparator measurements of density.

The density of each sector of the gray scale chart may or may not vary along its radius, according to whether a correcting circuit is employed. However, the intensity on the P. P. I. photographs varies greatly outward from the central present position point, so that when a spot on a P. P. I. photograph is to be evaluated it should be compared with portions of gray scale sectors at the same radius unless the latter are perfectly compensated for grayness change in radius. In the latter correlation of I. F. amplifier input intensity with reflector quality of course range must be taken into account.

What is claimed is:

1. A gray scale calibrator for a photographic recording transmission system comprising, a signal input circuit, an electronic transmission circuit connected to have a signal derived from said signal input circuit impressed thereon, an area display means connected to the output of said signal transmission circuit visually displaying the signal information transmitted by said transmission circuit, optical means positioned for optical recording of said area display means display, a signal generator producing a calibration signal, means for disconnecting said signal transmission circuit from said signal input circuit and connecting it to the output of said signal generator, and means for varying the amplitude of the calibration signal impressed on said signal transmission circuit over a selected range of amplitudes during the period of one complete display of said area display means.

2. A gray scale calibrator for a photographic recording transmission system comprising, a signal input circuit, an electronic transmission circuit connected to have a signal derived from said signal input circuit impressed thereon, a cathode ray tube connected to the output of said signal transmission circuit visually displaying the signal information transmitted by said transmission circuit, a camera positioned to record the cathode ray tube display, a signal generator producing a calibration signal, means for disconnecting said signal transmission circuit from said signal input circuit and connecting it to the output of said signal generator, and means for varying the amplitude of the calibration signal impressed on said signal transmission circuit over a selected range of amplitudes during the period of one complete scan of said cathode ray tube.

3. A gray scale calibrator for a photographic recording transmission system comprising, a signal input circuit, an electronic transmission circuit connected to have a signal derived from said signal input circuit impressed thereon, a cathode ray tube connected to the output of said signal transmission circuit visually displaying the signal information transmitted by said transmission circuit, a camera positioned to record the cathode ray tube display, a signal generator producing a calibration signal, a variable attenuator having the output of said signal generator impressed thereon, means for disconnecting said transmission circuit from said signal input circuit and connecting it to the output of said attenuator, and means for varying the attenuation of said attenuator over its range during the period of one scan of said cathode ray tube.

4. A gray scale calibrator for a photographic recording transmission system comprising, a signal input circuit, an electronic signal transmission circuit, a cathode ray tube connected to the output of said signal transmission circuit visually displaying the signal output of said signal transmission circuit, a camera positioned to record the cathode ray tube display, a signal generator producing a calibration signal, switch means normally connecting the input of said signal transmission circuit to said signal input circuit and operative to a second position to connect the output of said signal generator to the input of said signal transmission circuit, control means in said signal transmission circuit the adjustment of which varies the intensity of said cathode ray tube, means interconnected with said control means for operating said switch means to its second position whereby after each adjustment of said control means said calibrating signal is applied to said signal transmission circuit, and means for varying the amplitude of the calibration signal impressed on said signal transmission circuit over a selected range of amplitudes during the period of one scan of said cathode ray tube.

5. A gray scale calibrator for a photographic recording transmission system comprising, a signal input circuit, an electronic signal transmission circuit, a cathode ray tube connected to the output of said signal transmission circuit visually displaying the signal output of said signal transmission circuit, a camera positioned to record the cathode ray tube display, a signal generator producing a calibration signal, an attenuator adjustable in discrete steps having said calibration signal impressed thereon, switch means normally operative in one position to connect the input of said signal transmission circuit to said signal input circuit and operative to a second position to connect said signal transmission circuit to the output of said attenuator, control means operative to vary the density of the camera record of said cathode ray tube display, means interconnected with said control means and operative by the completion of the adjustment of said control means to actuate said switch means to its second position, and means for adjusting said attenuator over its range of discrete steps of attenuation during the period of one scan of said cathode ray tube.

6. A gray scale calibrator for a photographic recording transmission system comprising, a signal input circuit, an electronic signal transmission circuit, a cathode ray tube connected to the output of said signal transmission circuit visually displaying the signal output of said signal transmission circuit, a camera positioned to record the cathode ray tube display, a signal generator producing a calibration signal, an attenuator adjustable in discrete steps having said calibration signal impressed thereon, switch means normally operative in one position to connect the input of said signal transmission circuit to said signal input circuit and operative to a second position to connect said signal transmission circuit to the output of said attenuator, control means associated with said signal transmission circuit and said camera for adjusting the density of the camera record of the signal transmitted by said signal transmission circuit, means interlocked with said control means and operated by the completion of adjustment thereof to actuate said switch means to its second position, stepping means for varying said attenuator over its discrete steps of adjustment, motive means operating said stepping means, and deflection means for said cathode ray tube operated by said motive means.

7. A gray scale calibrator for a photographic recording radar system comprising, an antenna movable over a scanning area, a radar signal transmission circuit, a cathode ray tube connected to the output of said signal transmission circuit visually displaying the signal output thereof, a camera positioned to record said visual display, a signal generator producing a calibration signal, switch means normally operative in one position to complete a signal path between said antenna and said signal transmission circuit and operative in a second position to complete a signal path between said signal generator and said signal transmission circuit, motive means for moving said antenna over its scanning area, means for operating said switch means to its second position for the period occupied by one complete scan of said antenna over its scanning area, means operated by said motive means for varying the amplitude of the calibration signal impressed on said signal transmission circuit, and deflection means for said cathode ray tube operated by said motive means.

8. A gray scale calibrator for a photographic recording radar system comprising, an antenna movable over a scanning area, a radar signal transmission circuit, a cathode ray tube connected to the output of said signal transmission circuit visually displaying the signal output thereof, a camera positioned to record said visual display, a signal generator producing a calibration signal, switch means normally operative in one position to complete a signal path between said antenna and said signal transmission circuit and operative in a second position to complete a signal path between said signal generator and said signal transmission circuit, motive means for moving said antenna over its scanning area, control means associated with said signal transmission circuit and said camera for adjusting the density of the camera record of the signal transmitted by said signal transmission circuit, means interlocked with said control means and operated by the completion of adjustment thereof to actuate said switch means to its second position for the period occupied by one complete scan of said antenna over its scanning area, means operated by said motive means for varying the amplitude of the calibration signal impressed on said signal transmission circuit, and deflection means for said cathode ray tube operated by said motive means.

9. A gray scale calibrator for a photographic recording radar system comprising, an antenna movable over a scanning area, a radar signal transmission circuit, a cathode ray tube connected to the output of said signal transmission circuit visually displaying the signal output thereof, a camera positioned to record said visual display, a signal generator producing a calibration signal, an attenuator adjustable in discrete steps having said calibration signal impressed thereon, switch means normally operative in one position to complete a signal path between said antenna and said signal transmission circuit and operative in a second position to connect the input of said signal transmission circuit to the output of said attenuator, motive means for moving said antenna over its scanning area, means for operating said switch means to its second position for the period occupied by one complete scan of said antenna over its scanning area, means operated by said motive means for adjusting said attenuator over its range of discrete steps of attenuation during the period said switch means is in its second position, and deflection means for said cathode ray tube operated by said motive means.

10. A gray scale calibrator for a photographic recording radar system comprising, an antenna movable over a scanning area, a radar signal transmission circuit, a cathode ray tube connected to the output of said signal transmission circuit visually displaying the signal output thereof, a camera positioned to record said visual display, a signal generator producing a calibration signal, an attenuator adjustable in discrete steps having said calibration signal impressed thereon, switch means normally operative in one position to complete a signal path between said antenna and said signal transmission circuit and operative in a second position to connect the input of said signal transmission circuit to the output of said attenuator, motive means for moving said antenna over its scanning area, control means associated with said signal transmission circuit and said camera for adjusting the density of the camera record of the signal transmitted by said signal transmission circuit, means interlocked with said control means and operated by the completion of adjustment thereof to actuate said switch means to its second position for the period occupied by one complete scan of said antenna over its scanning area, means operated by said motive means for adjusting said attenuator over its range if discrete steps of attenuation during the period said switch means is in its second position and deflection means for said cathode ray tube operated by said motive means.

11. A gray scale calibrator for a photographic recording radar system comprising, a rotating antenna, a radar signal transmission circuit, a cathode ray tube connected to the output of said signal transmission circuit visually displaying the signal output thereof, a camera positioned to record said visual display, a signal generator producing a calibration signal, an attenuator adjustable in discrete steps having said calibration signal impressed thereon, switch means normally operative in one position to complete a signal path between said antenna and said signal transmission circuit and operative in a second position to connect the input of said signal transmission circuit to the output of said attenuator, motor means for rotating said antenna, means for operating said switch means to its second position for a period of one complete rotation of said antenna, stepping means for successively adjusting said attenuator to its discrete steps of attenuation, means operated by said motor for actuating said stepping means only during the interval said switch means is in its second position, and deflection means for said cathode ray tube operated by said motor.

No references cited.